US012776998B2

(12) United States Patent
Masters

(10) Patent No.: US 12,776,998 B2
(45) Date of Patent: Oct. 27, 2026

(54) SYSTEMS AND METHODS FOR USE IN BALANCING NETWORK RESOURCES

(71) Applicant: VOCALINK LIMITED, London (GB)

(72) Inventor: Neil Masters, West Yorkshire (GB)

(73) Assignee: VOCALINK LIMITED, London (GB)

(*) Notice: Subject to any disclaimer, the term of this patent is extended or adjusted under 35 U.S.C. 154(b) by 0 days.

(21) Appl. No.: 18/125,597

(22) Filed: Mar. 23, 2023

(65) Prior Publication Data

US 2024/0323139 A1 Sep. 26, 2024

(51) Int. Cl.

| | |
|---|---|
| ***G06F 15/173*** | (2006.01) |
| ***H04L 47/70*** | (2022.01) |
| ***H04L 47/78*** | (2022.01) |

(52) U.S. Cl.

CPC .......... *H04L 47/781* (2013.01); *H04L 47/821* (2013.01)

(58) Field of Classification Search

CPC . H04L 47/781; H04L 47/821; H04L 47/2425; H04L 47/805; H04L 47/823; H04L 47/483; H04L 47/2475; H04L 47/70; H04L 43/14; H04L 43/16; H04L 49/9005; H04L 67/1097; H04L 41/50

USPC .......................................................... 709/226

See application file for complete search history.

(56) References Cited

U.S. PATENT DOCUMENTS

| | | | | |
|---|---|---|---|---|
| 8,255,407 | B1 | 8/2012 | Grauper | |
| 9,076,134 | B2 * | 7/2015 | Grovit | G06Q 20/381 |
| 9,525,599 | B1 * | 12/2016 | Wang | H05K 3/32 |
| 9,870,589 | B1 * | 1/2018 | Arnold | G06Q 40/03 |
| 9,929,971 | B2 | 3/2018 | Ward, Jr. et al. | |
| 10,944,814 | B1 * | 3/2021 | Virtuoso | H04L 47/803 |
| 11,532,055 | B2 * | 12/2022 | Scheidler | G06Q 10/06393 |
| 11,789,827 | B2 * | 10/2023 | Narayanan | G06F 11/1453 709/201 |
| 2003/0229596 | A1 * | 12/2003 | Martinez | G06Q 20/382 705/64 |

(Continued)

FOREIGN PATENT DOCUMENTS

| | | | | |
|---|---|---|---|---|
| CN | 113448726 A * | 9/2021 | | G06F 9/5072 |
| WO | WO2021/209122 | 10/2021 | | |

OTHER PUBLICATIONS

U.S. Appl. No. 10/552,221, filed Feb. 4, 2020, Olshefski et al.

(Continued)

*Primary Examiner* — Thuong Nguyen

(74) *Attorney, Agent, or Firm* — Harness, Dickey & Pierce, P.L.C.

(57) ABSTRACT

Systems and methods are provided for allocating resources between data centers in response to insufficient resources at one of the data centers. One example computer-implemented method includes allocating, by a resource manager of a data center, resources for an institution, from a resource pool specific to the institution, to each of multiple nodes of the data center; receiving a request, from one of the multiple nodes, for additional resources for the institution; in response to the request, determining, by the resource manager, whether the resource pool specific to the institution includes the additional resources; and based on the additional resources not being included in the resource pool specific to the institution, instructing, by the resource manager the one of the multiple nodes to shut down and return remaining resources of the one of the multiple nodes to the resource pool specific to the institution.

15 Claims, 3 Drawing Sheets

(56) References Cited

U.S. PATENT DOCUMENTS

| | | | | |
|---|---|---|---|---|
| 2005/0021363 | A1* | 1/2005 | Stimson | G06Q 20/105 705/41 |
| 2005/0080697 | A1* | 4/2005 | Foss, Jr. | G06Q 40/00 705/35 |
| 2005/0080724 | A1* | 4/2005 | Foss, Jr. | G06Q 20/40 705/39 |
| 2006/0047709 | A1* | 3/2006 | Belin | G06F 9/465 |
| 2009/0307352 | A1* | 12/2009 | Felton | H04L 69/40 709/226 |
| 2010/0180031 | A1* | 7/2010 | Cacheria, III | G06Q 20/10 709/225 |
| 2011/0196790 | A1* | 8/2011 | Milne | G06Q 20/405 705/44 |
| 2011/0236013 | A1 | 9/2011 | Gazzola et al. | |
| 2012/0157042 | A1* | 6/2012 | McCanna | H04M 15/83 455/407 |
| 2012/0179594 | A1* | 7/2012 | Cole | G06Q 40/04 705/37 |
| 2013/0013556 | A1* | 1/2013 | Yamada | G06F 15/16 707/E17.005 |
| 2013/0142201 | A1* | 6/2013 | Kim | H04L 12/4645 370/392 |
| 2013/0166260 | A1* | 6/2013 | Fan | G06F 8/35 703/2 |
| 2014/0095321 | A1* | 4/2014 | Frigerio | G06Q 30/0279 705/14.69 |
| 2014/0136710 | A1* | 5/2014 | Benari | G06F 9/5044 709/226 |
| 2014/0223445 | A1* | 8/2014 | Beckmann | G06F 9/5011 718/104 |
| 2015/0100475 | A1* | 4/2015 | Cummings | G06Q 40/03 705/42 |
| 2015/0106420 | A1* | 4/2015 | Warfield | H04L 41/5041 709/201 |
| 2016/0012411 | A1* | 1/2016 | Kursun | G07F 19/205 705/42 |
| 2017/0046204 | A1 | 2/2017 | Li | |
| 2017/0262157 | A1* | 9/2017 | Shem Tov | G06F 3/0488 |
| 2018/0060132 | A1 | 3/2018 | Maru et al. | |
| 2018/0081751 | A1* | 3/2018 | Carmel | G06F 11/079 |
| 2019/0034849 | A1* | 1/2019 | Romaine | G06F 3/04842 |
| 2019/0034922 | A1* | 1/2019 | Castinado | G06Q 40/02 |
| 2019/0068515 | A1* | 2/2019 | Seely | H04L 45/72 |
| 2019/0166032 | A1* | 5/2019 | Inbaraj | H04L 43/16 |
| 2019/0347659 | A1 | 11/2019 | Hudson et al. | |
| 2020/0020066 | A1* | 1/2020 | Manilla | G06Q 20/381 |
| 2020/0026588 | A1* | 1/2020 | O'Kelley | G06F 9/466 |
| 2020/0065081 | A1* | 2/2020 | Lee | G06F 21/6245 |
| 2020/0074552 | A1* | 3/2020 | Shier | G06Q 20/10 |
| 2020/0167769 | A1* | 5/2020 | Green | G06Q 20/3825 |
| 2020/0183951 | A1* | 6/2020 | Mittal | G06F 16/2237 |
| 2020/0379671 | A1* | 12/2020 | Cui | G06F 3/0673 |
| 2021/0090029 | A1* | 3/2021 | Pak | G06F 16/1837 |
| 2021/0133894 | A1* | 5/2021 | Reses | G06N 20/00 |
| 2021/0168081 | A1* | 6/2021 | Gatchalian | G06Q 10/0631 |
| 2022/0012105 | A1 | 1/2022 | Chagam Reddy | |
| 2022/0053344 | A1 | 2/2022 | Vandikas et al. | |
| 2022/0075666 | A1* | 3/2022 | Xia | G06F 9/5077 |
| 2022/0122175 | A1* | 4/2022 | Haishima | A63F 5/04 |
| 2022/0138015 | A1 | 5/2022 | Verma et al. | |
| 2022/0140997 | A1* | 5/2022 | Lam | H04L 9/008 713/168 |
| 2023/0067155 | A1* | 3/2023 | Jackson | H04L 9/50 |
| 2023/0099664 | A1* | 3/2023 | Li | G06F 16/2365 707/703 |
| 2024/0323139 | A1* | 9/2024 | Masters | G06Q 20/10 |

OTHER PUBLICATIONS

Oukfif Karima et al: "Budget-Aware Performance Optimization of Workflows in Multiple Data Center Clouds", Topics in Cryptology—CT-RSA 2020: The Cryptographers' Track at the RSA Conference 2020, San Francisco, CA, USA, Feb. 24-28, 2020, vol. 10, No. 498422, Jan. 1, 2021 (Jan. 1, 2021), pp. 144-160, XP047575611, the whole document.

* cited by examiner

SYSTEMS AND METHODS FOR USE IN BALANCING NETWORK RESOURCES

FIELD

The present disclosure generally relates to systems and methods for use in balancing network resources and, in particular, to systems and methods for use in balancing network resources between data centers to accommodate resource demands in excess of resources allocated separately to the data centers.

BACKGROUND

This section provides background information related to the present disclosure which is not necessarily prior art.

It is known for network resources to be consumed through different network activities, such as, for example, purchase transactions. When a network resource includes a budget, or a limit of funds, for a given cycle, and where the budget (or limit) is assigned to a participant, transactions associated with the participant are applied to the budget (or limit) during the cycle to ensure sufficient resources are available to complete the transactions. In this manner, a network providing the budget resource to a participant is protected from transactions which are in excess of the budget resource for the participants.

DRAWINGS

The drawings described herein are for illustrative purposes only of selected embodiments and not all possible implementations, and are not intended to limit the scope of the present disclosure:

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

Resource allocation to participants may be employed as a mechanism for limiting exposure of a processing network, whereby each participant is limited to allocated resources per cycle. In various embodiments, the processing network may include multiple processing points, or data centers, whereby the resources for a participant are divided between the data centers. In such embodiments, remaining resources for the participant may be balanced, from time to time, during the cycle. That said, a transaction may require more resources than are available at one of the data centers, whereby the transaction is declined despite the existence of resources for that participant being available at another one (or more) of the date centers.

Uniquely, the systems and methods herein provide for allocation of resources through multiple data centers, yet where the allocations are governed by an overall limit of the resources for the associated participants. In particular, resource managers are included to allocate and control different nodes within each data center. The nodes, in turn, process usage of the resources (e.g., for debits, credits, etc.), and request additional allocations of the resources as needed (e.g., for specific institutions, etc.). The resource managers operate within the overall resource pool to allocate and/or shut down the nodes, as necessary, to provide usage of the resource pool. In this manner, separate nodes are enabled, through the resource manager, to process usage of the resources in parallel, through allocated resources, and to consolidate resources, from the nodes, as necessary, to provide for full usage of the resources. As such, an improved and efficient manner of allocating and managing resources in a network is provided.

Figure 1:
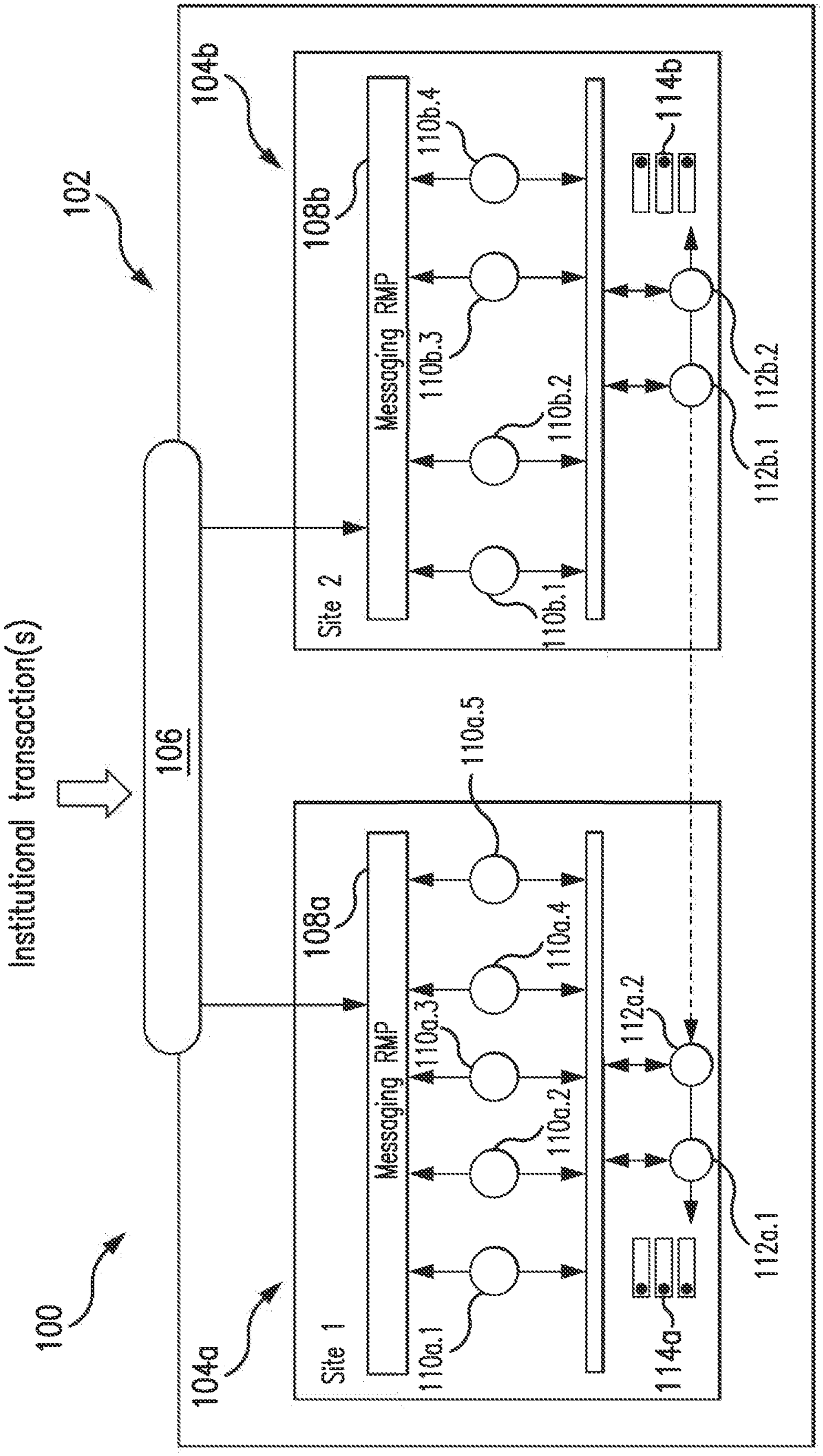
FIG. 1 illustrates an example system for use in adjusting network resources to data centers in connection with real-time transactions.

FIG. 1 illustrates an example system 100 in which one or more aspects of the present disclosure may be implemented. Although parts of the system 100 are presented in one arrangement, it should be appreciated that other example embodiments may include the same or different parts arranged otherwise depending on, for example, types of transactions and/or participants, privacy concerns and/or regulations, etc.

As shown in FIG. 1, the illustrated system 100 generally includes a processing network 102, which is configured to coordinate transactions between different parties. In particular, the processing network 102 is configured to enroll or onboard various different institutions (not shown), which are each associated with accounts to/from which the transactions are to be posted. The institutions may include, without limitation, financial institutions, such as, for example, banks, etc., and the transactions (i.e., the incoming institutional transaction(s)) may include payment account transactions, and specifically, real time transactions (e.g., pursuant to the ISO 20022 protocol standard, etc.).

The institutions may be located in the same region, or in multiple different regions (e.g., geographic regions, etc.), whereby the institutions may extend across the country, multiple countries, or globally, etc. For the purposes of the example in FIG. 1, as an indication of complexity and/or volume, it should be understood that the system 100 may include hundreds, thousands, or tens of thousands or more or less institutions, submitting hundreds of thousands or millions or more or less transaction per day, etc.

Given the above, the processing network 102 may include different data centers, for example, which may be geographically distributed (or otherwise separated (e.g., either physically and/or logically, etc.)), to coordinate processing of the transactions involving the different institutions. In this example embodiment, the processing network 102 includes two data centers 104*a*, 104*b*, as shown in FIG. 1 and designated Site 1 and Site 2. It should be appreciated that only one or more than two data centers may be included in other system embodiments consistent with the present disclosure. The processing network 102 includes a transaction workflow 106, for real time transactions, which is configured to, in general, receive and process real time transactions from the institutions (e.g., through directing fund transfers, issuing messaging (e.g., responses, etc.), etc.). In addition, as part of the processing, the transaction workflow 106 is configured to confirm the real time transactions are permitted by the processing network 102.

In particular, in connection with real time transactions, the processing network 102 is configured to assign a resource pool to each of the institutions, which is a limit to the amount of resources (e.g., funds, etc.) to be used by that specific institution in a given cycle (or interval). When the real time transaction is within the resource pool, the transaction is not halted or otherwise interrupted based on the resource pool, by the transaction workflow 106 or the processing network 102.

To implement the resource pool, the data centers 104*a*, 104*b*, in turn, are configured to track the resource pool, throughout the cycle, to renew the resource pool, as necessary, for each additional cycle, and to pass messaging related to the resource pool back to the transaction workflow 106.

As shown in FIG. 1, the data center 104*a* includes a message broker 108*a*, a series of nodes 110*a*.1-5, two resource managers 112*a*.1-2, and a ledger 114*a*. In this example embodiment, the transaction workflow 106 is configured to forward transactions from the institutions to the data centers 104*a*. 104*b*, as appropriate (e.g., based on region, suitable load balancing, the specific institutions, etc.). In addition in this example embodiment, the data center 104*a* includes corresponding parts (with corresponding numbering).

With respect to the data center 104*a*, upon receipt of the transactions, and in particular, transaction messaging for the transactions, the messaging broker 108*a* (e.g., the Messaging RMQ (i.e., RabbitMQ platform in this example)) is configured to distribute transaction messaging to the different nodes 110*a*.1-5. In this example, the data center 104*a* includes five different nodes 110*a*.1-5, which are each controlled by the resource managers 112*a*. Specifically, for a given institution, each of the resource managers 112*a* is configured to coordinate a cycle. In doing so, the resource manager 112*a*.1, for cycle A, for example, is configured to distribute the resource pool to the different nodes 110*a*.1-5, and also to the resource manager 112*b*.1 in the data center 104*b*, to allocate resources for transactions directed to Site 2. For example, where the resource pool includes $20M for institution A, the resource manager 112*a*.1, for cycle A, may be configured to allocate $4M to each of the nodes 110*a*.1, 110*a*.2 and 110*a*.3, and then $8M to the resource manager 112*b*.1 in the data center 104*b* (for allocation thereby). In this example embodiment, the nodes 110*a*.1-3 are debit nodes, configured to debit resources for real time debit transactions, while the nodes 110*a*.4-5 are credit nodes, configured to credit resources for real time credit transactions.

In turn, the messaging broker 108*a* is configured to distribute the real time transactions to the nodes 110*a*.1-5, as appropriate. The nodes 110*a*.1-5 are configured to queue the transactions received from the messaging broker 108*a* and to maintain a running total of available resources based on the processing of each transaction. For example, upon receipt of a $10,000 transaction for institution A, the node 110*a*.2 is configured to reduce the resource allocation of institution A from $4M to $3.99M, and so on for additional transactions. Each of the nodes 110*a*.1-5 is configured to process real time transactions sequentially and to return a confirmation of sufficient resources for the real time transactions, or not.

In addition, in this embodiment, the nodes 110*a*.1-5 are configured to report, at one or more regular or irregular intervals, or based on a level of allocated resources, the available resources to the resource manager 112*a*.1 for the specific cycle, for example, cycle A. In turn, the resource manager 112*a*.1 is configured to further allocate resources from the resource pool to the nodes 110*a*.1-3, as necessary, and to add to the resource pool for credit transactions to the nodes 110*a*.4-5, to continue to update the available resources for the institution A, as transactions as processed by the data center 104*a*. In addition, the resource manager 112*a*.1 is configured to further balance the resource pool based on available resources in the data center 104*b*, whereby the available resources may be credited or further allocated to the data center 104*b*, as appropriate.

In one example embodiment, in response to a report from node 110*a*.1, and a lack of additional resources in the resource pool for the institution A, the resource manager 112*a*.1, during cycle A, is configured to direct the node 110*a*. 1 to halt receipt of transactions from the message broker 108*a* and to return the remaining available resources to the resource manager 112*a*.1. The node 110*a*. 1 is configured to notify the message broker 108*a* that the node 110*a*.1 is not accepting transactions (or configured to simply stop responding to the message broker 108*a*), and when the last transaction in the queue thereof is processed, to report the available resources to the resource manager 112*a*.1. As a result, the node 110*a*.1 is effectively shut down. The resource manager 112*a*.1 is configured to hold the resources from the node 110*a*.1, or to further allocate the resources to another node, as needed, thereby permitting a consolidation of the available resources in the resource pool for the institution A, despite the distribution of the resource pool, at least originally, over multiple nodes.

It should be understood that when sufficient available resources exist for the institution A in cycle A, or another cycle is initiated, the resource manager 112*a*.1, or the resource manager 112*a*.2 for another cycle, may be configured to allocate resources to the node 110*a*.1, thereby returning the node 110*a*.1 to normal or non-shut down operation.

Further, when the cycle A is ended, each of the nodes 110*a*.1-5 is configured to report available resources, and to continue operating in the manner described above. More specifically, as processing of a transaction is not halted or stopped for cutover between different cycles, each of the nodes 110*a*.1-5 is configured to process for multiple cycles at the same time, whereby each node is configured to permit a new cycle to be initiated or started, while a prior cycle is finishing. At the cutover between the cycles, each node is configured to complete the available resources (i.e., the available resources become static for the cycle) for the node (e.g., for each credit or debit in the cycle, etc.), and to report the completed available resources to the resource manager 112*a*.1, in this example, which may be used in reconciliation and/or audit of the associated resources. Further, each node is configured to initiate the new cycle with the available resources from the last cycle, whereby the available resources are increased or decreased (as a counter specific to the cycle) by credit or debit transactions, respectively. In this manner, the cycles (e.g., hourly, bi-hourly, daily, or some other suitable interval (e.g., every four hours, every six hours, etc.), etc.) provide cutover points for purposes of record keeping, reconciliation, etc., of the associated resources, etc.

The resource managers 112*a* are configured to generate a running total of the resource pool in the ledger 114*a*. In doing so, for each cycle, the resource managers 112*a* are configured to record an entry for available resource notices from the different nodes 110*a*.1-5 and to maintain a running total of the overall available resources for the institution in the specific cycle (e.g., institution A in cycle A, etc.). The ledger 114*a*, in this example, may include an immutable ledger, such as, for example, a blockchain ledger, or otherwise, etc. Similar to the resource managers 112 controlling the nodes 110, the resource managers 112 may be configured to be controlled by a backend server, whereby common control, allocation and/or consolidation among the resource managers 112 is enabled.

It should be understood that, similar to the management of the nodes 110*a*.1-5, the resource managers 112*a*, or conversely, the resource managers 112*b*, are configured to manage resource pools across different data centers by allocating and consolidating resources (e.g., the resource manager 112*a*. 1 may request allocation of resources from the resource manager 112*b*.1, or vice-versa, etc.). It should be further understood that the resource managers 112 are further configured to record an entry to the respective ledgers 114 to reflect allocations to other data centers, whereby resources from the respective data centers may be allocated and/or consolidated (between the data centers) to provide for maintenance of the data centers (e.g., as related to the transaction service, etc.) or redundancy associated with failure at the respective data centers, etc.

It should be appreciated that while the above is explained with reference to institution A, the resource managers 112, and the data centers 104, more broadly, are configured to manage resource pools for each of the institutions interacting with the processing network 102.

Figure 2:
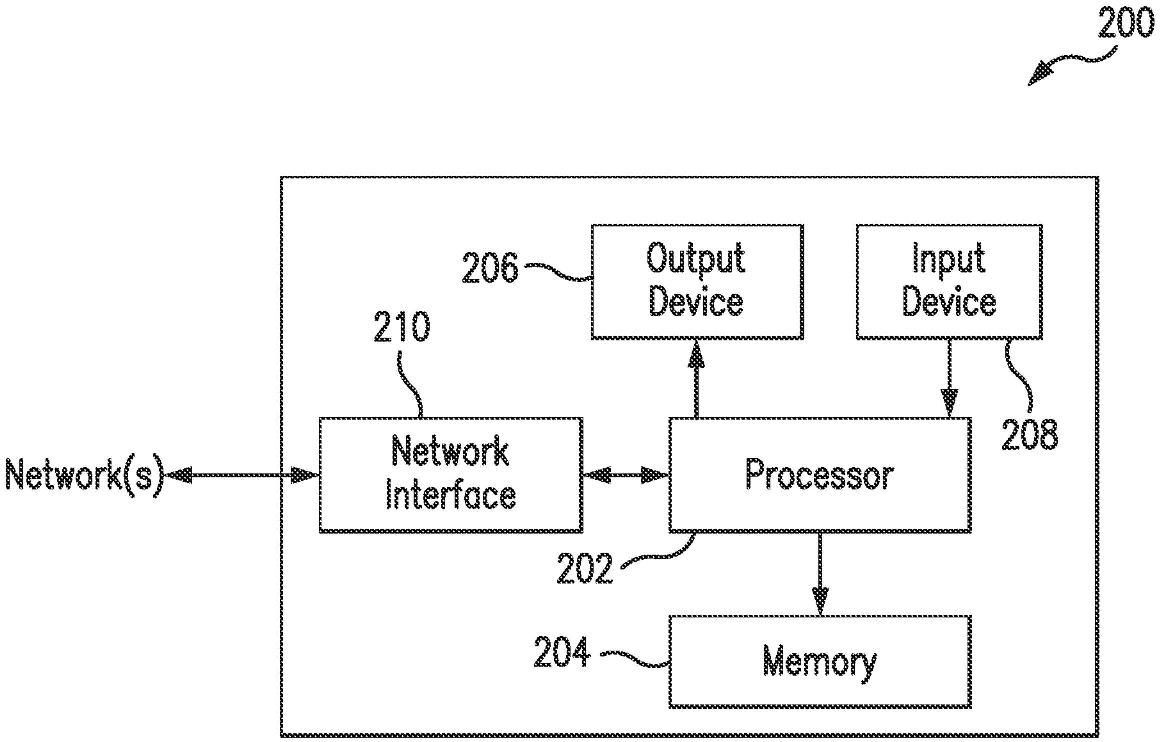
FIG. 2 is a block diagram of an example computing device that may be used in the system of FIG. 1.

FIG. 2 illustrates an example computing device 200 that can be used in the system 100. The computing device 200 may include, for example, one or more servers, workstations, personal computers, laptops, tablets, smartphones, etc. In addition, the computing device 200 may include a single computing device, or it may include multiple computing devices located in close proximity, or multiple computing devices distributed over a geographic region, so long as the computing devices are specifically configured to function as described herein. In at least one embodiment, the computing device 200 is accessed (for use as described herein) as a cloud, fog and/or mist type computing device. In the system 100, the processing network 102, the message brokers 108, the nodes 110, the resource managers 112 and the ledgers 114, may each include and/or be considered one or more computing devices, which may include or be consistent, in whole or in part, with the computing device 200. With that said, the system 100 should not be considered to be limited to the computing device 200, as described below, as different computing devices and/or arrangements of computing devices may be used. In addition, different components and/or arrangements of components may be used in other computing devices.

Referring to FIG. 2, the example computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permits data, instructions, etc., to be stored therein and retrieved therefrom. The memory 204 may include one or more computer-readable storage media, such as, without limitation, dynamic random-access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, ledger entries, resource running totals, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein (e.g., one or more of the operations recited in the methods herein, etc.), such that the memory 204 is a physical, tangible, and non-transitory computer readable storage media. Such instructions often improve the efficiencies and/or performance of the processor 202 and/or other computer system components configured to perform one or more of the various operations herein, whereby upon executing such instructions the computing device 200 operates as (or transforms into) a specific-purpose device configured to then effect the features described herein. It should be appreciated that the memory 204 may include a variety of different memories, each implemented in one or more of the functions or processes described herein.

In the example embodiment, the computing device 200 also includes an output device 206 that is coupled to (and that is in communication with) the processor 202. The output device 206 outputs information, audibly or visually, for example, to a user associated with any of the entities illustrated in FIG. 1, at a respective computing device, etc., to view available resources, etc. The output device 206 may include, without limitation, a liquid crystal display (LCD), a light-emitting diode (LED) display, an organic LED (OLED) display, an "electronic ink" display, speakers, etc. In some embodiments, the output device 206 may include multiple devices.

In addition, the computing device 200 includes an input device 208 that receives inputs from the user (i.e., user inputs) from users in the system 100, etc. The input device 208 may include a single input device or multiple input devices, which is/are coupled to (and is in communication with) the processor 202 and may include, for example, one or more of: a keyboard, a pointing device, a mouse, a touch sensitive panel (e.g., a touch pad or a touch screen, etc.), and/or an audio input device.

Further, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating through the one or more networks, and generally, with one or more other computing devices, etc.

Figure 3:
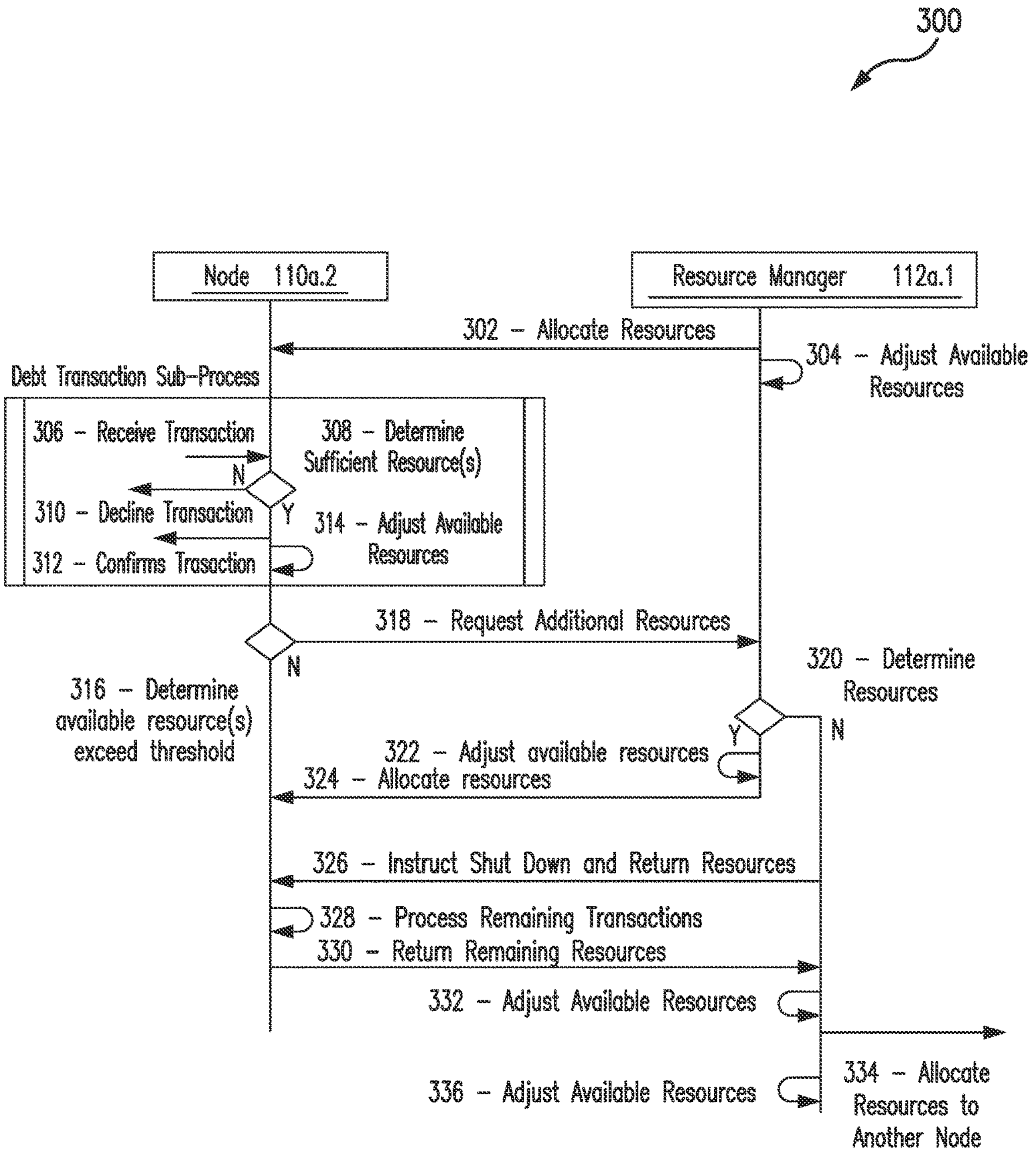
FIG. 3 illustrates an example method that may be implemented via the system of FIG. 1, for use in adjusting network resources to data centers in connection with real-time transactions.

FIG. 3 illustrates an example method 300 for use in allocating network resources. The example method 300 is described (with reference to FIG. 1) as generally implemented in the data center 104*a* and other parts of the system 100, and with further reference to the computing device 200. As should be appreciated, however, the methods herein should not be understood to be limited to the example system 100 or the example computing device 200, and the systems and the computing devices herein should not be understood to be limited to the example method 300.

At the outset, at 302, the resource manager 112*a*. 1 allocates resources to the node 110*a*.2 for the institution B (and likewise, generally, allocates resources to the node 110*a*.1 and 110*a*.3, etc.). In this example, the allocated resources may include various different amounts of resources, such as, for example, \$1M, \$10, or more of less, based on the particular institution B, or potentially, the region in which the data center 104*a* is situated relative to the institution B. or other suitable reasons, etc. The resource manager 112*a*. 1 also adjusts, at 304, the available resources in the resource pool, by an entry to the ledger 114*a*, as held by the resource manager 112*a*.1, to reflect the allocation.

Next, at 306, the node 110*a*.2 receives a real time transaction for institution B, i.e., a debit transaction (from the message broker 108*a*), stores the debit transaction in a queue of transactions, and sequentially, at 308, determines whether sufficient resources are available for institution B. In particular, the node 110*a*.2 determines whether a running total of debit transactions plus the amount of the real time transaction exceeds the allocated resources to the node 110*a*.2 (e.g., Allocated Resource−(Running total+amount of transaction)>0, etc.). When there are insufficient resources, the node 110*a*.2 declines, at 310, the real time debit transaction. Conversely, in this example, where the transaction includes an amount of $500, and the allocated resources include $1M, the node 110*a*.2 determines there is sufficient resources, at 308, and then confirms the transaction, at 312, and adjusts, at 314, the available resources for the institution B in the node 110*a*.2 (e.g., by debiting the $500 from the available resources of $1M, etc.).

The debit transaction sub-process, which is indicated by the box in FIG. 3, continues as long as the node 110*a*.2 is accepting transactions for the institution B.

At one or more regular or irregular intervals (or at each adjustment of available resources), the node 110*a*.2 determines, at 316, whether the available resources exceed a defined threshold. The threshold may include, for example, some percentage of the resources allocated to the node 110*a*.2 (e.g., 5%, 10%, etc.), or some other threshold relative to transactions to the institution, B or otherwise. When the node 110*a*.2 determines that the defined threshold is exceeded, the node 110*a*.2 continues in the debit transaction sub-process for the institution B.

Conversely, when the available resources for the institution B do not exceed the defined threshold, the node 110*a*.2 requests, at 318, additional resources be allocated. Upon receipt of the request, the resource manager 112*a*. 1 determines, at 320, whether resources are available in the resource pool for the institution B. When the resources are available, the resource manager 112*a*.1 also adjusts, at 322, the available resources in the resource pool, by an entry to the ledger 114*a*, as held by the resource manager 112*a*.1 for the institution B, to reflect the allocation, and further, the resource manager 112*a*.1 allocates, at 324, as above, the resources to the node 110*a*.2, whereby the node 110*a*.2 is replenished with resources to continue processing transactions (e.g., pursuant to the debit transaction sub-process, etc.).

When available resources (or a defined amount of resources) is/are not available, at 320, the resource manager 112*a*.1 instructs, at 326, the node 110*a*.2 to shut down and return available resources to the resource manager 112*a*.1. It should be appreciated that the defined amount of resources may be defined by a threshold, which is generic or specific to a particular institution, as a threshold sufficient to support certain transactions (e.g., certain numbers of transactions, certain types of transactions, certain sizes of transactions, etc.) and also to promote the consolidation of resources, as suited to a particular implementation/institution, etc. For example, institutions accustomed to larger transactions may be associated with higher defined amounts to ensure available resources are properly consolidated to avoid improperly disallowing a transaction, where sufficient resources are available across multiple nodes.

In connection with the above, it should be appreciated that the resource managers 112 may participate in inter-data center balancing, whereby the resource managers 112 act to balance available resources between the data centers 104*a*, 104*b* (e.g., 50% of available resources, etc.). The inter-data center balancing may occur once per cycle, or at another regular or irregular intervals, etc.

With reference again to FIG. 3, after shut down, the node 110*a*.2 processes the remaining debit transactions in the queue, if any, at 328, and thereafter, returns the available resources, at 330, to the resource manager 112*a*.1. That is, the node 110*a*.2 reports the available resources to the resource manager 112*a*.1, while shut down, which transfers the available resources back to the resource manager 112*a*.1. The resource manager 112*a*.1, as shown, adjusts, at 332, the available resources in the resource pool, by an entry to the ledger 114*a*, as held by the resource manager 112*a*.1 for the institution B, to reflect the returned allocation of resources from the node 110*a*.2.

In connection therewith, the resource manager 112*a*.1 allocates the resources, at 334, to another node (e.g., the node 110*a*.3, etc.), thereby consolidating the available resources at another node (which is not shut down). The resource manager 112*a*.1 further adjusts the available resources, at 336, in the resource pool, by an entry to the ledger 114*a*, as held by the resource manager 112*a*.1 for the institution B, to reflect the allocation to the other node.

In view of the above, the systems and methods herein provide for distribution of available resources among different nodes, whereby parallel processing of resource requests is permitted. That said, the allocation of the resources is coordinated by a resource manager, whereby consolidation of the resources to one or more of the nodes is enabled to available declining resource demands when the resources are available across the nodes, overall.

Again, and as previously described, it should be appreciated that the functions described herein, in some embodiments, may be described in computer executable instructions stored on a computer-readable media, and executable by one or more processors. The computer-readable media is a non-transitory computer-readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) allocating, by a resource manager of a data center, resources for an institution, from a resource pool specific to the institution, to each of multiple nodes of the data center; (b) receiving a request, from one of the multiple nodes, for additional resources for the institution; (c) in response to the request, determining, by the resource manager, whether the resource pool specific to the institution includes the additional resources; (d) based on the additional resources not being included in the resource pool specific to the institution, instructing, by the resource manager the one of the multiple nodes to shut down and return remaining resources of the one of the multiple nodes to the resource pool specific to the institution; (c) adjusting, by the resource manager, the resource pool specific to the institution, via an entry to a ledger, based on the allocation of resources to each of the multiple nodes; and/or (f) adjusting, by the resource manager, the funds in the resource pool, via an entry to a ledger indicative of the resource pool.

Example embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a." "an." and "the" may be intended to include the plural forms as well, unless the context clearly indicates otherwise. The terms "comprises." "comprising," "including." and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to." "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first." "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A processing network for allocating resources, the processing network comprising:

a data center including multiple nodes, a message broker computing device, and a resource manager computing device in communication with the multiple nodes, each of the multiple nodes being a cloud-based computing device;

wherein the resource manager computing device is configured, by first executable instructions, to allocate resources of an institution, from a resource pool specific to the institution, to each of the multiple nodes;

wherein the message broker computing device is configured, by second executable instructions, to distribute a plurality of real time transactions, specific to the institution, to the multiple nodes, whereby the multiple nodes utilize the allocated resources of the institution to process the real time transactions; and wherein the resource manager computing device is further is configured, by the first executable instructions, to:

receive a request, from one of the multiple nodes, for additional resources of the institution from the resource pool specific to the institution;

in response to the request, determine whether or not the resource pool specific to the institution includes the additional resources, which are not allocated to the multiple nodes; and based on determining that the additional resources are not included in the resource pool specific to the institution, instruct the one of the multiple nodes to shut down and return remaining resources already allocated to the one of the multiple nodes to the resource pool specific to the institution; and wherein, in response to the instruction to shut down, the one of the multiple nodes is configured to:

halt responding to the message broker computing device of the data center;

process transactions included in a queue specific to the one of the multiple nodes; and return a remaining portion of the resources allocated to the one of the multiple nodes to the resource pool specific to the institution.

2. The processing network of claim 1, wherein the resource manager computing device is configured, by the first executable instructions, to adjust the resource pool specific to the institution, via an entry to a ledger, based on the allocation of resources to each of the multiple nodes.

3. The processing network of claim 1, wherein the resources allocated to each of the multiple nodes includes funds; and wherein the resource manager computing device is further configured, by the first executable instructions, to adjust funds in the resource pool specific to the institution based on the allocation of funds for the institution to each of the multiple nodes.

4. The processing network of claim 3, wherein the resource manager computing device is configured, by the first executable instructions, to adjust the funds in the resource pool, via an entry to a ledger indicative of the resource pool.

5. The processing network of claim 1, wherein the multiple nodes include debit nodes dedicated to debit ones of the real time transactions and credit nodes dedicated to credit ones of the real time transactions; and wherein the resource manager computing device is configured, by the first executable instructions, to increase the resource pool based on a notification from one of the credit nodes.

6. The processing network of claim 1, wherein the resource manager computing device is configured, by the first executable instructions, to, based on the resource pool including the additional resources:

allocate additional resources of the institution, from the resource pool specific to the institution, to the one of the multiple nodes; and adjust resources in the resource pool specific to the institution based on the allocation of the additional resources to the one of the multiple nodes.

7. The processing network of claim 1, wherein each of the multiple nodes is configured, in order to process ones of the plurality of real time transactions, to, for each of the ones of the plurality of real time transactions:

determine whether the resources allocated to the node exceeds an amount of the real time transactions; and in response to the resources allocated to the node exceeding the amount, confirm the real time transaction and adjust the resource allocated to the node by the amount.

8. A computer-implemented method for use in allocating resources, the method comprising:

allocating, by a resource manager of a data center, resources of an institution, from a resource pool specific to the institution, to each of multiple nodes of the data center, each of the multiple nodes being a cloud-based computing device;

distributing, by a message broker of the data center, a plurality of real time transactions, specific to the institution, to the multiple nodes of the data center to utilize the resources of the institution allocated to the multiple nodes to process the real time transactions;

receiving a request, from one of the multiple nodes, for additional resources of the institution from the resource pool specific to the institution;

in response to the request, determining, by the resource manager, whether the resource pool specific to the institution includes the additional resources, which are not allocated to the multiple nodes; and based on determining that the additional resources are not included in the resource pool specific to the institution, instructing, by the resource manager, the one of the multiple nodes to shut down and return remaining resources already allocated to the one of the multiple nodes to the resource pool specific to the institution.

9. The computer-implemented method of claim 8, further comprising adjusting, by the resource manager, the resource pool specific to the institution, via an entry to a ledger, based on the allocation of resources to each of the multiple nodes.

10. The computer-implemented method of claim 8, wherein the resources allocated to each of the multiple nodes includes funds; and wherein the method further comprises adjusting, by the resource manager, funds in the resource pool specific to the institution based on the allocation of the funds to each of the multiple nodes.

11. The computer-implemented method of claim 10, further comprising adjusting, by the resource manager, the funds in the resource pool, via an entry to a ledger indicative of the resource pool.

12. The computer-implemented method of claim 8, wherein the multiple nodes include debit nodes dedicated to debit ones of the real time transactions and credit nodes dedicated to credit ones of the real time transactions; and wherein the method further comprises increasing, by the resource manager, the resource pool based on at least one notification from one of the credit nodes.

13. The computer-implemented method of claim 8, further comprising, in response to the instruction to shut down:

halting, by the one of the multiple nodes, responding to the message broker of the data center;

processing, by the one of the multiple nodes, transactions included in a queue specific to the one of the multiple nodes; and returning, by the one of the multiple nodes, a remaining portion of the resources allocated to the one of the multiple nodes to the resource pool specific to the institution, via the resource manager.

14. The computer-implemented method of claim 8, further comprising, for each node of the multiple nodes:

receiving, by the node, a real time transaction from a message broker of the data center, the real time transaction including an amount;

determining, by the node, whether the resources allocated to the node exceed the amount; and in response to the resources allocated to the node exceeding the amount:

confirming, by the node, the real time transaction; and adjusting, by the node, the resource allocated to the node by the amount.

15. A computer-implemented method for use in allocating resources, the method comprising:

allocating, by a resource manager of a data center, resources of an institution, from a resource pool specific to the institution, to each of multiple nodes of the data center, each of the multiple nodes being a cloud-based computing device;

distributing, by a message broker of the data center, a plurality of real time transactions, specific to the institution, to the multiple nodes of the data center to utilize the resources of the institution allocated to the multiple nodes to process the real time transactions;

receiving a request, from one of the multiple nodes, for additional resources of the institution from the resource pool specific to the institution;

in response to the request, determining, by the resource manager, whether the resource pool specific to the institution includes the additional resources, which are not allocated to the multiple nodes; and based on the resource pool including the additional resources:

allocating, by the resource manager, additional resources of the institution, from the resource pool specific to the institution, to the one of the multiple nodes; and adjusting, by the resource manager, resources in the resource pool specific to the institution based on the allocation of the additional resources to the one of the multiple nodes.

* * * * *